United States Patent [19]

Hinkens et al.

[11] Patent Number: 5,390,771

[45] Date of Patent: Feb. 21, 1995

[54] HYDRAULIC CALIPER BRAKE ASSEMBLY FOR A BICYCLE

[75] Inventors: George H. Hinkens, Fox Point; Curt H. Blaszczyk, Sturtevant, both of Wis.

[73] Assignee: Hayes Industrial Brake, Inc., Mequon, Wis.

[21] Appl. No.: 51,474

[22] Filed: Apr. 22, 1993

[51] Int. Cl.$^6$ .......................... B62L 1/10; B60T 11/14
[52] U.S. Cl. ..................... 188/344; 188/24.12; 188/72.4
[58] Field of Search ............. 188/72.4, 72.5, 72.6, 188/196 R, 71.7, 71.9, 344, 24.12, 24.22; 280/75, 76

[56] References Cited

U.S. PATENT DOCUMENTS

| | | | |
|---|---|---|---|
| 2,414,753 | 1/1947 | Majneri | 188/140 R |
| 3,297,115 | 1/1967 | Waloen et al. | 188/71.7 |
| 3,935,930 | 2/1976 | Kine | 188/344 |
| 5,082,093 | 1/1992 | Sule | 188/24.22 |
| 5,193,833 | 3/1993 | Reisinger | 188/72.4 |
| 5,259,483 | 11/1993 | Pelfrey | 188/72.4 |

FOREIGN PATENT DOCUMENTS 1274412  5/1992  United Kingdom ............... 188/344

Primary Examiner—Robert J. Oberleitner
Assistant Examiner—Chris Schwartz
Attorney, Agent, or Firm—Foley & Lardner

[57] ABSTRACT

A caliper brake assembly for a bicycle having a fork, a wheel having an axle mounted in said fork, and a brake disk mounted on the wheel, the assembly including a caliper housing mounted on the fork in a position to bridge the brake disk, the housing including an arm connected to the axle and a blind bore in the housing having a closed end and an open end, a piston mounted in the bore on each side of the disk, each piston including a brake pad, a master cylinder assembly connected to the bore, the caliper housing including passages connecting the open end of the blind bore to the closed end of the blind bore, and a lever assembly mounted on the bicycle for actuating the master cylinder assembly to pressurize the bore and move the pistons into engagement with the disk to brake the rotary motion of the wheel.

13 Claims, 3 Drawing Sheets

HYDRAULIC CALIPER BRAKE ASSEMBLY FOR A BICYCLE

FIELD OF THE INVENTION

The present invention relates to a disk brake assembly for a bicycle and more specifically to a cable applied caliper type hydraulic double piston disk brake assembly for a bicycle.

BACKGROUND OF THE INVENTION

Caliper type disk brakes, hydraulic or mechanical, generally provided on bicycles include a caliper having a fixed brake pad on one side of the brake disk and a movable brake pad mounted on a piston on the other side of the brake disk. The brake is actuated by a hand operated lever mounted on the handlebar of the bicycle which is connected to the caliper by a cable. Compensation for wear of the brake pads can be adjusted for on the lever and on the caliper body to vary the stroke of operation of the cable.

One type of hydraulic brake on the market is connected to the fork by two screws that are located above the axle. There is no part of the brake that goes down to the axle. To use this brake requires buying a special fork that accepts this brake. Another type of brake on the market can be adapted to most forks. This brake has an arm that goes down to the axle. However, you must disconnect the cable and a fork hose clamp to remove the wheel. The brake stays with the wheel when the wheel is removed. This is cumbersome and takes a lot of time, and special tools are required to remove the caliper.

The two types of disk brakes presently on the market have one fixed pad and one movable pad. To allow the fixed pad to move away from the disk, the brake in one case and the disk in the other are mounted on pins which matingly engage corresponding bores. The pins will cause minimal drag when a good design is well maintained. However if the design is poor or any rust or dirt get between the pins and bores, the drag will increase. Even a minimal drag will irritate and impair the power of the rider.

SUMMARY OF THE PRESENT INVENTION

The present invention relates to a caliper type hydraulic brake for a bicycle and more particularly to a double opposed piston hydraulic caliper disk brake.

One of the primary features of the present invention is the provision of a one piece casting having a bore with a master cylinder housing and a bleed valve housing formed as an integral part of the brake casting. The one piece casting lowers cost and weight.

Wheel removal has been simplified by providing an arm on the casting which includes a slot to matingly engage the wheel axle. The casting is pivotally mounted on the bicycle fork thus making it possible to swing the brake away from the axle during disassembly thereby allowing for the removal of the wheel and brake disk from the bicycle. The direction of the angle of the slot in the arm of the casting also holds the casting on the axle during braking if a rider forgets to tighten the axle quick release.

A further feature of the double cylinder caliper brake is the provision of a variable size fork clamp which can be adjusted to fit most bicycle forks. This is achieved by providing a resilient tape between the clamp and the fork which compensates for different sized forks.

One of the primary advantages of the double piston type caliper brake is the ability to adjust for brake pad wear on the caliper. This has been achieved by providing an adjustable cap in the open end of the bore on the casting for changing the pad gap.

In accordance with another aspect of the invention the caliper can be adjusted to center the brake disk between the pistons in the caliper and thereby eliminate drag. This has been achieved by mounting the caliper on a screw on the fork clamp or to a bracket permanently attached to the fork. The screw can be turned to center the disk between the pad assemblies.

Another feature of the invention is the provision of a brake which has a closed hydraulic system so that the bicycle can be turned upside down without losing hydraulic fluid.

Other principal features and advantages of the invention will become apparent to those skilled in the art upon review of the following drawings, the detailed description and the appended claims.

Figure 1:
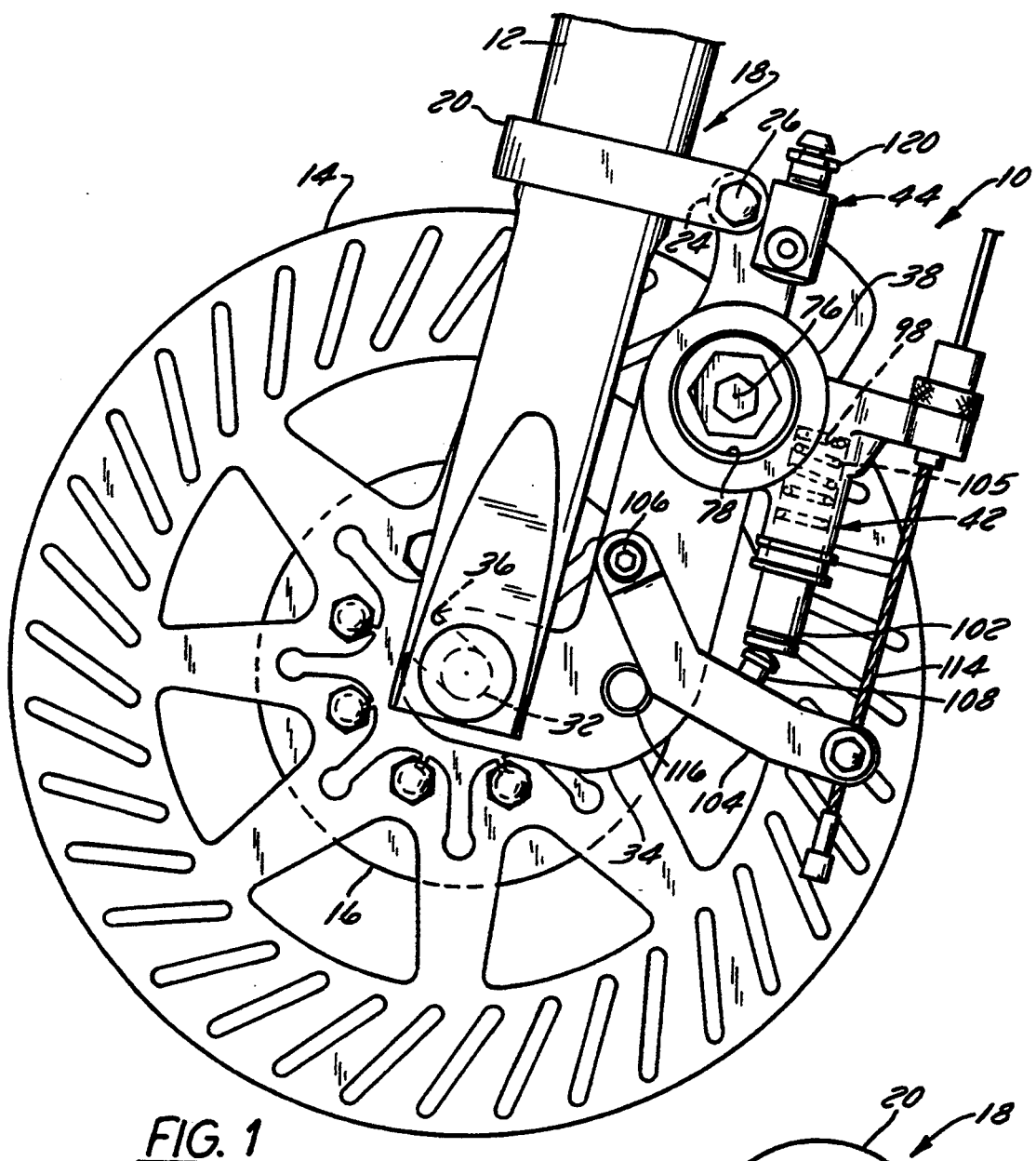
FIG. 1 is a side elevation view of the double piston hydraulic caliper disk brake shown mounted on the fork of a bicycle.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 6:
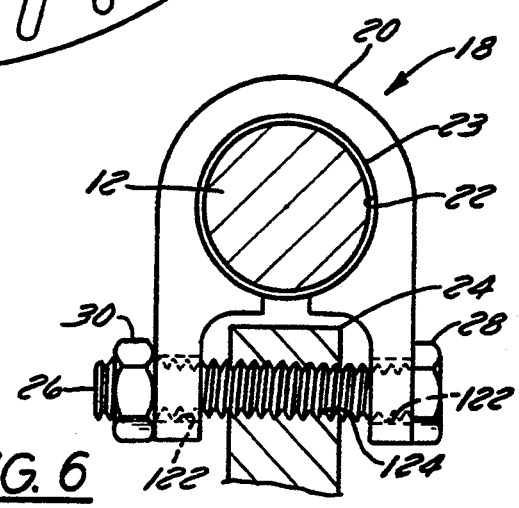
FIG. 6 is a top view of the clamp assembly shown mounted on the caliper housing.

The brake caliper 10 according to the present invention, as shown in the drawings, is mounted on the fork 12 of a bicycle in a position to engage the outer periphery of a brake disk 14 mounted on the wheel hub 16. The caliper 10 is mounted on the fork 12 by means of a clamp assembly 18 which is adjustable for mounting on different size forks. The clamp assembly 18 as shown in FIG. 6 includes a clamp 20 having an opening 22 which generally conforms to the shape of the fork 12. The clamp 20 can be adapted to different size forks by wrapping a resilient tape 23, either rubber or plastic, and clamping the clamp 20 over the tape. The clamp 20 is pivotally connected to a housing 24 on the top of caliper 10 by a threaded pin 26 having a bolt head 28 at one end and a hex nut 30 on the other end. The lower end of the caliper 10 is connected to the axle 32 of the bicycle by means of a "J" shaped arm 34 having a slot 36 which matingly engages the axle 32 of the wheel. It should be noted that the caliper 10 will tend to pivot about the pin 26 in the direction of rotation of the wheel when the brake is applied, forcing the slot 36 in the "J" shaped arm 34 against the axle 32. This arrangement also allows for a quick and easy removal of the wheel from the bicycle frame. This is accomplished by pivoting the caliper 10 including the "J" shaped arm 34 away from the axle 32 of the wheel which allows the wheel to be easily removed.

Figure 3:
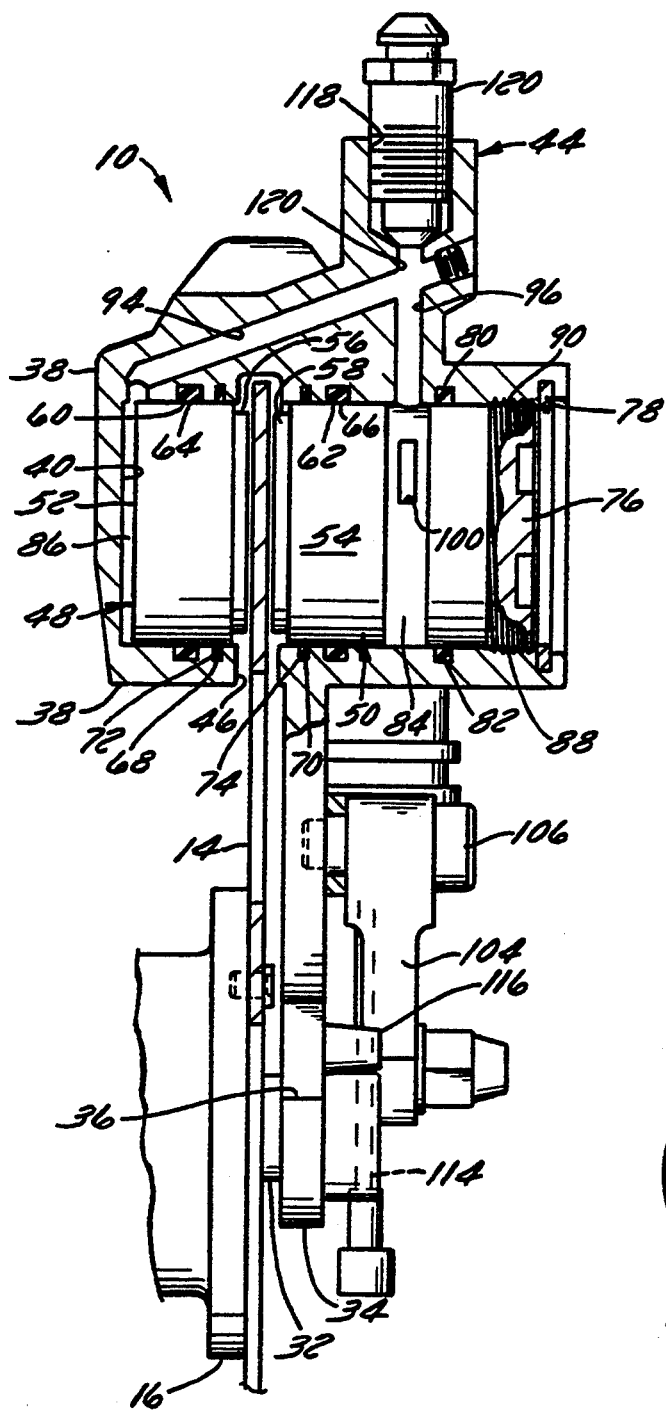
FIG. 3 is a cross section view of a portion of the caliper showing the brake disk aligned with the pistons in the bore of the caliper.
Figure 4:
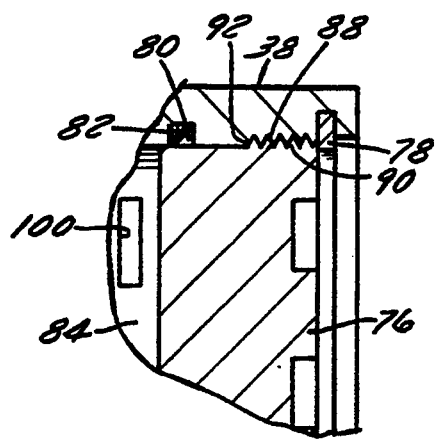
FIG. 4 is an enlarged cross section view of the cap shown mounted in the blind bore.
Figure 2:
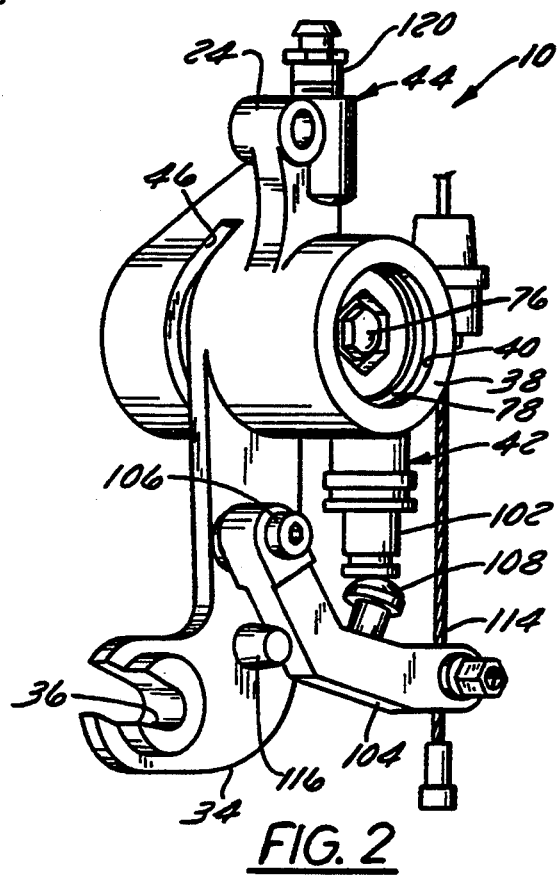
FIG. 2 is a perspective view of the caliper according to the invention.

The caliper 10 generally includes a cast aluminum cylindrical housing 38, as shown in FIGS. 2 and 3, having a blind bore 40. A master cylinder housing 42 and an air bleed cylinder housing 44 are formed as an integral part of the cylindrical housing 38. A slot 46 is provided in the caliper housing 38 in a spaced relation to the closed end of bore 40.

Piston assemblies 48 and 50 are positioned in the blind bore 40 on each side of the slot 46. Each piston assembly includes a piston 52 and 54, respectively, and a brake pad 56 and 58, respectively. The pistons are sealed in the bore 40 by means of seal rings 60 and 62 seated in grooves 64 and 66, respectively, provided in the bore 40 around the outer perimeter of pistons 52 and 54. Wipers 68 and 70 are provided in grooves 72 and 74 in the bore 40 to wipe the outside surfaces of the pistons 52 and 54.

The open end of bore 40 is closed by means of a cap 76 which is positioned in the open end of the bore 40 and locked therein by means of a retaining ring 78. The cap 76 is sealed in the bore 40 by means of a seal ring 80 seated in groove 82 provided in the open end of bore 40. The cap 76 is initially seated on the retaining ring 78 to provide a space 84 between piston 54 and cap 76. This space can be reduced as described hereinafter by turning the threaded section 88 on cap 76 inwardly on the threaded section 90 in bore 40. The inward movement of cap 76 is limited by a shoulder 92 at the end of threaded section 90 in bore 40. The space 84 is connected to the space 86 between piston 52 and the inner end of bore 40 by passages 94 and 96.

Figure 5:
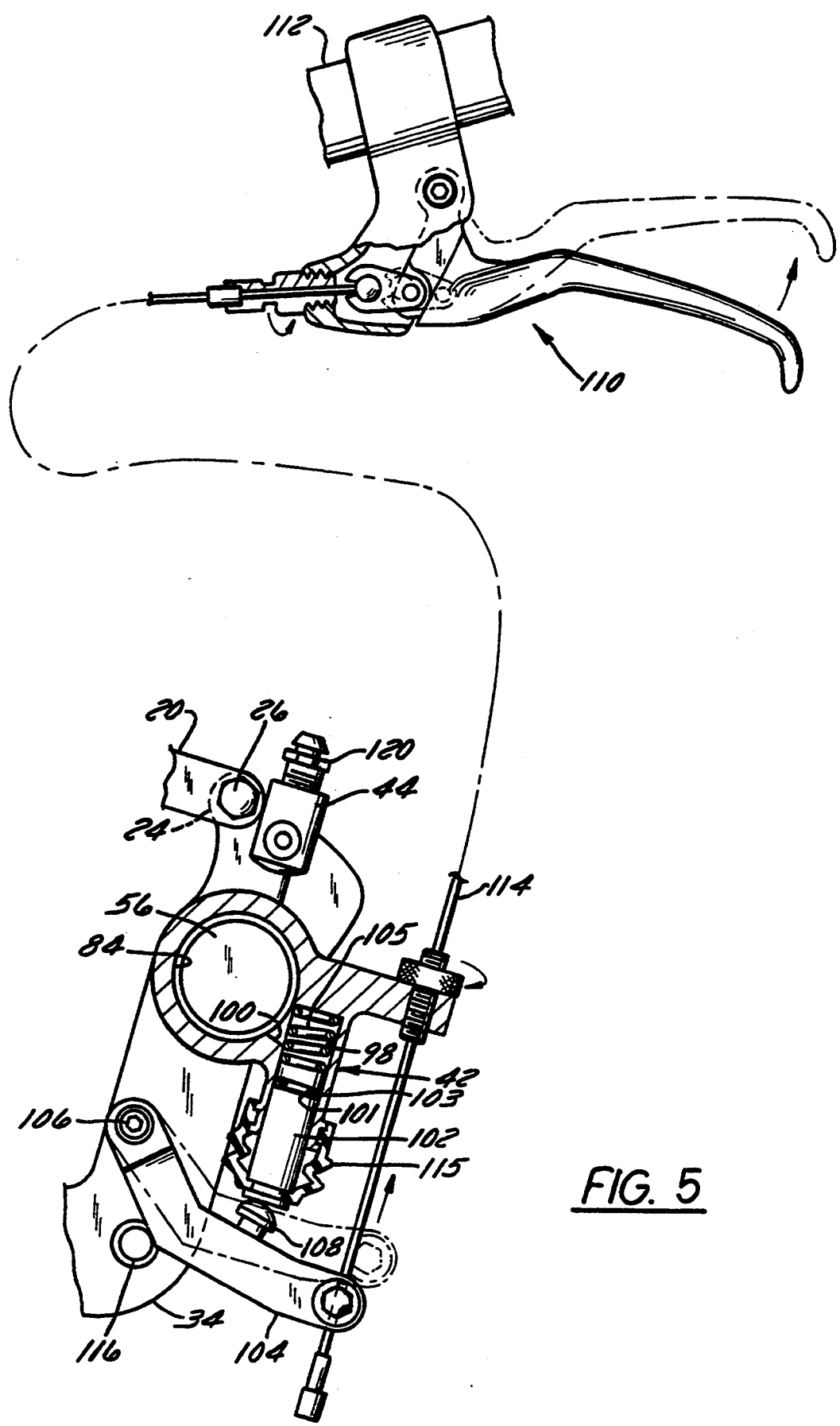
FIG. 5 is a view of the hand operated lever shown connected to the operating lever for the master cylinder.

The master cylinder housing 42 as shown in FIG. 5 includes a blind bore 98 which is connected to the space 84 between the cap 76 and the piston 54 by means of a passage 100. A piston 102 is positioned in the blind bore 98 which is actuated by a lever 104 pivotally mounted on a bolt 106 on the arm 34. The piston 102 includes a groove 101 having an O-ring 103 positioned therein to seal the piston in the housing. A return spring 105 is provided in the bore 98 to bias the piston to the open position. The lever 104 includes a post 108 which is positioned to engage the end of piston 102. The lever 104 is connected to a hand lever 110 mounted on the handlebar 112 by a cable 114 with post 108 abutting the end of piston 102. A stop 116 is formed on the "J" shaped arm 34 to limit the rotation of lever 104 so that piston 102 will not drop out of the housing 42. A boot 115 may be provided to protect the piston from contamination.

The piston 102 is pushed up to pressurize the fluid in the spaces 84 and 86 in bore 40 by squeezing the hand lever 110 to pivot the lever 104 upward against the piston 102. Fluid will enter the bore 40 through passage 100 pressurizing the fluid in passages 94 and 96 to simultaneously pressurize the spaces 84 and 86 moving both piston assemblies 48 and 50 into engagement with disk 14. The bleed housing 44 includes a threaded bore 118 which is connected to the end of passage 96 by a port 126 at the end of bore 118. A threaded plug 120 is screwed into the threaded bore 118 to block the port 126. Air in the passages 84, 86, 94, 96 and 98 can be released by backing the plug 120 off the port 126.

Means are provided for centering the disk 14 between the brake pads 56 and 58 in the slot 46 in the caliper housing 38. Such means as shown in FIG. 6, is in the form of the threaded pin 26 mounted in clamp assembly 18. In this regard, the threaded pin 26 is threadedly received in a threaded opening 124 provided in the housing 24 at the top of the caliper housing 38. The adjustment pin 26 is frictionally free to rotate in the openings 122 in the fork clamp 20. The caliper pads 56 and 58 are centered on the disk 14 by rotating the pin 26 in the threaded opening 124 in the housing 24. The screw 26 remains fixed in the openings 122 in the fork clamp 20 and as the caliper housing is moved axially with respect to the threaded opening 124 of housing 24. Although only one screw is described herein to adjust the position of the caliper housing, it is within the contemplation of the invention to use one screw to close the clamp on the fork and a second screw to adjust the housing.

Thus, it should be apparent that there has been provided in accordance with the present invention a hydraulic caliper brake assembly for a bicycle that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A caliper brake assembly in combination with a bicycle having a frame, a fork mounted on the frame, a wheel supported on the fork and a brake disk mounted on the wheel, said assembly comprising:

a brake assembly mounted on the fork, said assembly including a unitary housing having a blind bore and a slot in said blind bore intermediate the ends of said blind bore, the brake disk being aligned with said slot, a pair of piston assemblies mounted in said blind bore for movement into engagement with opposite sides of said disk, a passage in said housing interconnecting the opposite ends of said bore, a master cylinder in said caliper housing operatively connected to pressurize said blind bore for movement of said piston assemblies into engagement with said disk, and means mounted on the bicycle to actuate said master cylinder to move said piston assemblies into engagement with said disk.

2. The combination according to claim 1 including passage means in said housing interconnecting said master cylinder with said piston assemblies to equalize the pressure on the piston assemblies, and a bleed housing formed in said caliper housing for releasing air from said passage means.

3. The combination according to claim 2 including a cap mounted on one end of said housing in a spaced relation to one of said pistons, said cap being adjustable to maintain said gap.

4. A caliper brake assembly in combination with a bicycle fork having an axle and a wheel mounted on the fork and a brake disk mounted on the wheel, said assembly comprising:

a caliper housing pivotally mounted on the fork in a position to bridge the brake disk, said housing having an arm removably connected to the axle and a first blind bore in said housing having a closed end and an open end, a piston assembly mounted in said first blind bore on each side of said disk, each piston assembly including a brake pad, a second blind bore in said housing connected to said first blind bore, a master cylinder assembly mounted in said second blind bore, a passage in said caliper housing connecting said open end of said first blind bore to said closed end of said first blind bore, and means mounted on the bicycle and connected to said master cylinder assembly for pressurizing said first blind bore to move said brake pads into engagement with said disk to brake the rotary motion of the wheel.

5. The brake assembly according to claim 4 including a cap mounted in the open end of said first blind bore in a spaced relation to one of said pistons, said pressurizing means being connected to said first blind bore between said cap and said piston.

6. The caliper brake assembly according to claim 5 wherein said cap is adjustable to compensate for wear of said brake pads.

7. The caliper brake assembly according to claim 6 including a limit stop in said first blind bore to prevent over travel of said cap to prevent damage to the piston assembly and disk due to wear of the brake pads.

8. A double piston caliper brake assembly in combination with a bicycle fork having an axle mounted on the fork, a wheel rotatably mounted on said axle and a brake disk mounted on said wheel, said brake assembly comprising:

a housing having a first blind bore having a slot intermediate the ends of said bore and a second blind bore, a clamp assembly pivotally mounted on the upper end of said housing for mounting the housing on the fork of the bicycle with the brake disk aligned in said slot, an arm formed on said housing for securing the lower end of the housing to the wheel axle, a piston assembly mounted in said first blind bore on each side of said slot for movement into engagement with said disk, a cap mounted on the open end of said first blind bore in a spaced relation to one of said piston assemblies, passage means in said housing connecting the space between said cap and said one of said piston assemblies and the space between the end of the first blind bore and the other of said piston assemblies and a master cylinder assembly mounted in said second blind bore and being operatively connected to said space between the cap and said one of said piston assemblies for pressurizing said piston assemblies into engagement with said disk.

9. The caliper brake according to claim 8 wherein each of said piston assemblies includes a piston and a brake pad, and said cap is adjustable to compensate for wear of said brake pads.

10. The caliper brake according to claim 9 wherein said clamp assembly includes a compressible tape to accommodate various size forks.

11. The caliper brake according to claim 10 including means for adjusting the position of the housing to center said brake pads with respect to the disk.

12. A double piston caliper brake assembly in combination with a bicycle having a fork, an axle on said fork, a wheel mounted on said axle and a brake disk mounted on said wheel axle, said brake assembly comprising:

a housing having a blind bore and a slot intermediate the ends of said bore, a universal clamp assembly pivotally mounting the housing on the fork of the bicycle with the brake disk aligned with said slot, an arm on said housing for releasably connecting the housing to the wheel axle, a piston assembly mounted in said blind bore on each side of said slot for movement into engagement with said disk, a cap mounted in the open end of said blind bore in a spaced relation to one of said piston assemblies, a passage in said housing connecting said space between said cap and said one of said piston assemblies and the space between the end of said bore and the other of said piston assemblies, and a master cylinder assembly connected to the space between said cap and said one of said piston assemblies for pressurizing said piston assemblies into engagement with said disk.

13. The brake according to claim 12 wherein said arm includes a slot for connecting the arm to the axle of the wheel, said arm being located to pivot in a direction counter to the direction of rotation of the wheel whereby said axle will be seated in said slot.

* * * * *